United States Patent
Frimout et al.

(12) 
(10) Patent No.: US 7,046,260 B2
(45) Date of Patent: May 16, 2006

(54) MENU GENERATING METHOD AND RECORDING DEVICE FOR A RECORD CARRIER

(75) Inventors: Emmanuel David Lucas Michael Frimout, Eindhoven (NL); Marten Derk Van Der Laan, Groningen (NL)

(73) Assignee: Koninklijke Philips Electronics, Eindhoven (NL)

( * ) Notice: Subject to any disclaimer, the term of this patent is extended or adjusted under 35 U.S.C. 154(b) by 240 days.

(21) Appl. No.: 10/204,022

(22) PCT Filed: Dec. 17, 2001

(86) PCT No.: PCT/IB01/02587

§ 371 (c)(1),
(2), (4) Date: Aug. 15, 2002

(87) PCT Pub. No.: WO02/50837

PCT Pub. Date: Jun. 27, 2002

(65) Prior Publication Data

US 2003/0021588 A1    Jan. 30, 2003

(30) Foreign Application Priority Data

Dec. 20, 2000  (EP)  .................................. 00204692

(51) Int. Cl.
    *G09G 5/00*    (2006.01)
(52) U.S. Cl. ...................... 345/660; 345/629; 348/684; 375/245; 382/232
(58) Field of Classification Search ........ 345/619–620, 345/624, 629–630, 638, 640–641, 660, 547; 348/403.1, 420.1, 422.1, 565, 420, 691, 684; 375/240.2, 240.23, 240.24, 240.25, 245, 375/246, 240; 382/232, 236; 386/112, 124
See application file for complete search history.

(56) References Cited

U.S. PATENT DOCUMENTS

| | | | | |
|---|---|---|---|---|
| 5,485,279 A | * | 1/1996 | Yonemitsu et al. .... | 375/240.14 |
| 5,535,013 A | * | 7/1996 | Murata ....................... | 382/239 |
| 5,784,011 A | * | 7/1998 | Malladi et al. ............... | 341/67 |
| 5,963,260 A | * | 10/1999 | Bakhmutsky .......... | 375/240.24 |
| 6,057,855 A | * | 5/2000 | Barkans ..................... | 345/629 |
| 6,351,599 B1 | * | 2/2002 | Komeno ..................... | 386/70 |
| 6,606,746 B1 | * | 8/2003 | Zdepski et al. ............... | 725/37 |

FOREIGN PATENT DOCUMENTS

| | | | |
|---|---|---|---|
| EP | 0607904 A2 | | 7/1994 |
| EP | 0805600 A2 | | 11/1997 |
| JP | 2001184839 | * | 7/2001 |
| WO | WO9964991 | | 12/1999 |
| WO | WO0030112 | | 5/2000 |

* cited by examiner

*Primary Examiner*—Matthew C. Bella
*Assistant Examiner*—Wesner Sajous
(74) *Attorney, Agent, or Firm*—Michael E. Belk

(57) ABSTRACT

The present invention relates to a menu picture generating method and to a recording device for recording a menu picture on a record carrier (20), wherein a key frame picture is scaled and then compressed before being assembled by a slice replacement operation. The entire menu picture assembly operation is performed in the compressed picture domain, wherein no pictures need to be decoded and only small part of the menu picture, corresponding to the scaled key frame picture, needs to be encoded. Thereby, the normal encoding-decoding pipeline of the recording device is not required for menu generation, such that hardware and software requirements can be reduced.

20 Claims, 3 Drawing Sheets

MENU GENERATING METHOD AND RECORDING DEVICE FOR A RECORD CARRIER

The present invention relates to a method for generating a menu picture according to the preamble of claim 1 and to a recording device for recording a menu picture on a record carrier, according to the preamble of claim 12.

Recently, record carriers such as optical discs with a large recording capacity have been developed, such that several recording items such as movies can be recorded on a single optical disc. To play back recording items from the optical disc in various ways, it is necessary to record various information items representing the recording items such that any recorded information item, e.g. movie information item, may be selected and reproduced. To select and reproduce such recording items, a selection information for use in selecting desired recording items must be recorded on the optical disc, as well. Therefore, a menu picture for selecting the desired recorded information item is generated and recorded on the optical disc.

To obtain such a menu picture, it is required to offer or generate a disc menu (e.g. a table of content) according to a concerned video standard, such as DVD (Digital Versatile Disc). According to the video standard, the menu can be composed of a background audio and video information, and sub-pictures can be used for text and highlights. Typically, a menu is composed of a background still-picture (which may be MPEG (Moving Pictures Experts Group) encoded) and a sub-picture (graphics) overlay for the text and highlights (e.g. buttons).

In a recording device, the menu is presented with specific key frames, each one representing a track or recording. Each used key frame is scaled and a number of key frames are assembled together to form the menu picture. Each time a new recording is added to the disc, an entirely new background picture needs to be assembled. This can either be achieved from the scratch or by just adding the new key frame to the old background picture.

Document EP-A-0 738 078 discloses a menu generating method and recording device as initially defined, wherein a number of decoding and encoding actions need to be performed so as to generate a menu picture with an arbitrary key frame configuration. In particular, the background picture needs to be decoded, each of the key frames need to be decoded, each key frame needs to be scaled to a smaller size, the menu background needs to be assembled using the above key frames, and the new menu picture needs to be encoded and recorded to an appropriate area on the disc.

Furthermore, when a recording is added on an existing disc, the existing menu picture needs to be decoded, one key frame of the last recording needs to be decoded, the key frame needs to be scaled and the new menu picture is assembled using the decoded old menu picture and the new scaled key frame. Then, the new menu picture is encoded and recorded to the appropriate area on the disc.

In the above scenarios, at least two pictures need to be decoded, one picture needs to be scaled and one picture needs to be encoded. In a typical recording system, it is desirable to perform the above described menu authoring functions in the background while the normal encoding or decoding pipeline is used for other tasks, such as audio/video loopthrough. It is desirable that the complexity of the menu authoring operation is minimized with respect to both software and hardware implementations.

It is therefore an object of the present invention to provide a menu generating method and a recording device, by means of which the processing requirements for menu authoring are reduced.

This object is achieved by a method for generating a menu picture, as defined in claim 1, and by a recording device as defined in claim 12.

Accordingly, since the entire operation of assembling the background picture is performed in the compressed picture domain, no pictures need to be decoded and only a small part of a picture, i.e. the scaled key frame picture, is encoded. Thus, the need for full picture decoding and encoding is eliminated and only a very limited amount of memory is required.

According to an advantageous development, the assembling step is performed by replacing entire portions of the background picture by new portions which represent the scaled at least one key frame picture. Thereby, entire portions or slices of the background picture are replaced by new slices that represent the scaled key frame. In this case, each of the portions has a predetermined size and the key frame picture constitutes an integer number of the portions. Thus, the key frame pictures are placed on a grid of a predetermined number of pixels and the scaled key frame picture constitutes an integer number of the slices. The scaled at least one key frame picture at least may be stored as a separate entity comprising a set of the portions. Thereby, the insertion and replacement is facilitated in the background picture. The background picture may comprise a grid of the portions, wherein boundaries of the portions are located at insertion positions of the at least one key frame picture. Thus, the key frame insertion operation can be performed as a slice replacement operation, which is a simple byte operation.

The key frame scaling may be optimised by only supporting a picture scaling by a factor eight. A scaled non-compressed picture can then be extracted from a compressed picture by performing a simple variable length decoding operation. In particular, the scaled non-compressed key frame picture may be extracted, and the DC coefficients or components of every block may be extracted and de-quantized so as to perform the scaling operation. Thereby, a large performance gain can be achieved by eliminating the need to perform an IDCT (Inverse Discrete Cosine Transform) operation, eliminating the need to de-quantize AC coefficients and eliminating the need to perform anti-aliasing filtering before the scaling operation.

As an alternative to the factor eight scaling, the scaling step may be performed by decoding macroblocks and deriving their contribution to the scaled at least one key frame picture. Thereby, a cropping of the scaled frames to the nearest macroblock can be prevented. By employing a limited number of codewords per block, the processing requirements for IDCT and inverse quantization can be limited.

According to an advantageous development of the recording device, the scaling means may comprise variable run-length decoding means for performing a variable length decoding of the selected key frame picture, and extracting means for extracting DC coefficients of predetermined macroblocks of the decoded key frame picture. Furthermore, searching means may be provided for searching the predetermined macroblocks.

Alternatively, the scaling means may comprise decoding means for decoding macroblocks, and may be arranged to derive a contribution of the decoded macroblocks to the scaled at least one key frame picture.

Further advantageous modifications of the invention are defined in the dependent claims.

In the following, the invention will be described in more detail with reference to the accompanying drawings, in which.

Figure 1:
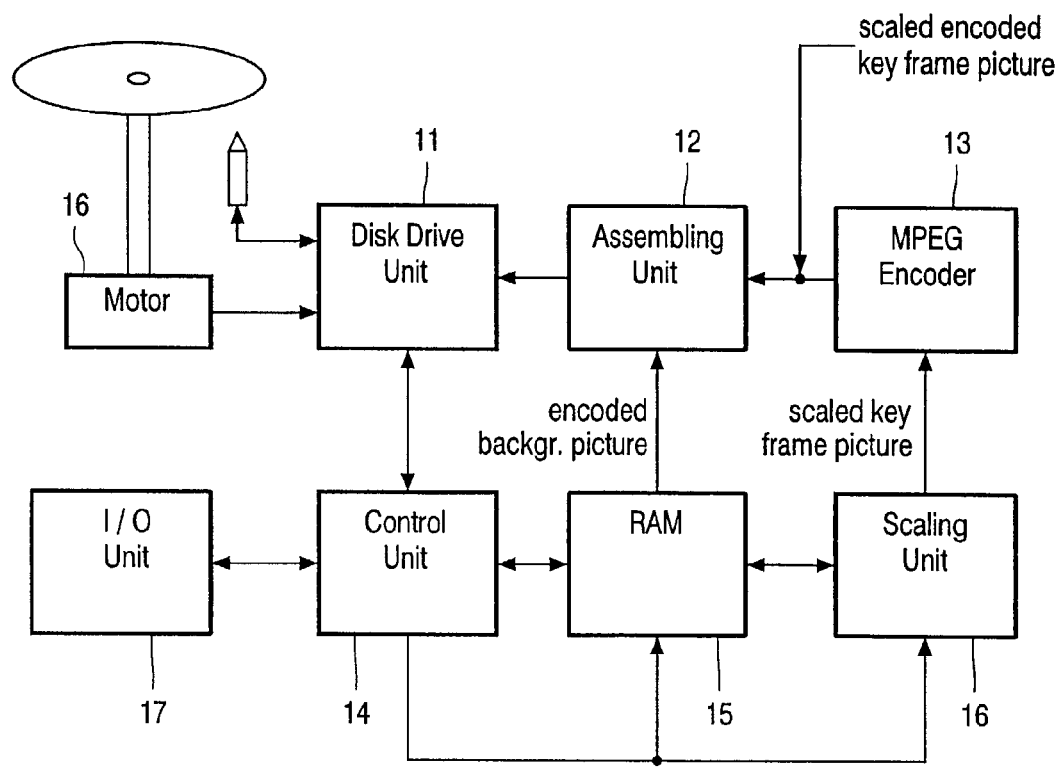
FIG. 1 shows a basic block diagram of an optical disc player according to a preferred embodiment of the present invention.

The preferred embodiment will now be described on the basis of an optical disc player, e.g. DVD-player as shown in FIG. 1.

FIG. 1 is a block diagram showing basic components of the optical disc player. According to FIG. 1, the optical disc player comprises a disc drive unit 11 for recording on and reproducing from a recordable optical disc 20 (e.g. a DVD+R/W disc or a DVD playback compatible disk) by using a laser been applied onto the recordable optical disc 20. Furthermore, the disc drive unit 11 is arranged to control a spindle motor 18 which rotates the recordable optical disc 20. Additionally, a volatile memory such as a static or dynamic Random Access Memory (RAM) 15 is provided for storing recording and/or reproducing data and background and key frame picture data.

A control unit 14 such as a system processor which may be controlled by a system CPU section operated in accordance with programs stored in a system memory section is arranged to control the recording and reproducing operation. The control operation of the control unit 14 is monitored and controlled by an input/output unit 17, such as an operating panel and a display.

According to the preferred embodiment, an assembling unit 12 is provided for assembling a background picture read from the RAM 15 and a scaled encoded key frame picture applied from an MPEG encoder 13 in the encoded or compressed picture domain, such that only the scaled small part of the menu picture has to be encoded. Furthermore, a scaling unit 16 is provided which reads a selected key frame picture from the RAM 15 and performs a scaling operation according to a corresponding area in the background picture. The scaling operation of the scaling unit 16 is controlled by the control unit 14.

The assembling operation in the assembly unit 12 is performed by replacing entire slices of the encoded background picture by new slices representing the scaled key frame picture. This can be achieved by placing the key frame pictures on a grid of e.g. 16×16 pixels, wherein the scaled key frame picture constitutes an integer number of the slices. Thus, if the scaled key frames are stored in the RAM 15 as separate entities (e.g. as a part of the disc standard), this can be done as a set of slices to thereby facilitate insertion and replacement of the scaled key frames in the background picture. An appropriate slice grid is chosen for the background picture, wherein slice boundaries are provided at positions where the scaled key frame pictures are to be inserted. Thus, the key frame insertion can be performed in the assembly unit 12 as a byte operation.

The scaling operation can be optimised by only supporting a scaling by the factor eight. In this case, a scaled, non-compressed picture can be extracted from a compressed picture merely by performing a variable length decoding, extracting the DC coefficient of every macroblock (8×8 pixel), and dequantizing the DC coefficients.

Figure 2:
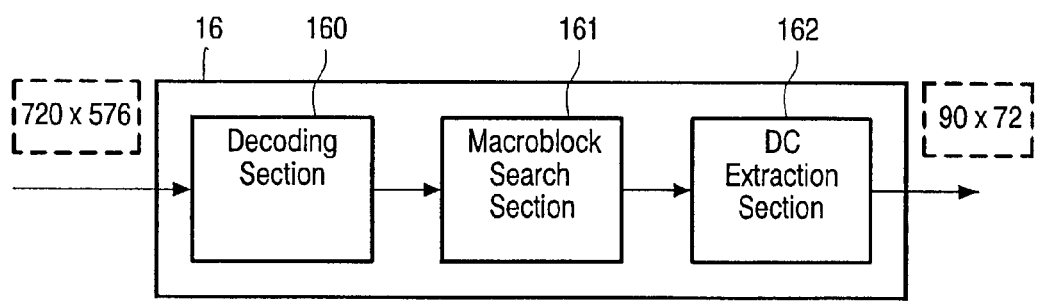
FIG. 2 shows a basic block diagram of a scaling unit of the optical disc player according to the preferred embodiment.

In the following, typical DVD resolutions and the scaled picture size are described with the constraint of a factor eight scaling as shown in FIG. 2. Furthermore, the number of macroblocks in the resulting scaled frame are constraint to an integer number.

The following table indicates predetermined parameters of available picture sizes, wherein a macroblock has a size of 16×16 pixels.

TABLE

| Original size | | Wide screen | DC coefficient | | Aspect ratio | | Correct size | | Macroblocks | | Cropped size | |
|---|---|---|---|---|---|---|---|---|---|---|---|---|
| x | y | | x | y | x | Y | x | y | x | y | x | y |
| 720 | 576 | no | 90 | 72 | 1 | 1 | 90 | 72 | 5 | 4 | 80 | 64 |
| 720 | 576 | yes | 90 | 72 | 1,33 | 1 | 120 | 72 | 7 | 4 | 112 | 64 |
| 704 | 576 | no | 88 | 72 | 1 | 1 | 88 | 72 | 5 | 4 | 80 | 64 |
| 360 | 576 | no | 45 | 72 | 2 | 1 | 90 | 72 | 5 | 4 | 80 | 64 |
| 720 | 480 | no | 90 | 60 | 1 | 1 | 90 | 60 | 5 | 3 | 80 | 48 |
| 720 | 480 | yes | 90 | 60 | 1,33 | 1 | 120 | 60 | 7 | 3 | 112 | 48 |
| 704 | 480 | no | 88 | 60 | 1 | 1 | 88 | 60 | 5 | 3 | 80 | 48 |
| 360 | 480 | no | 45 | 60 | 2 | 1 | 90 | 60 | 5 | 3 | 80 | 48 |
| 720 | 288 | no | 90 | 36 | 1 | 2 | 90 | 72 | 5 | 4 | 80 | 64 |
| 720 | 288 | yes | 90 | 36 | 1,33 | 2 | 120 | 72 | 7 | 4 | 112 | 64 |
| 704 | 288 | no | 88 | 36 | 1 | 2 | 88 | 72 | 5 | 4 | 80 | 64 |
| 360 | 288 | no | 45 | 36 | 2 | 2 | 90 | 72 | 5 | 4 | 80 | 64 |
| 720 | 240 | no | 90 | 30 | 1 | 2 | 90 | 60 | 5 | 3 | 80 | 48 |
| 720 | 240 | yes | 90 | 30 | 1,33 | 2 | 120 | 60 | 7 | 3 | 112 | 48 |
| 704 | 240 | no | 88 | 30 | 1 | 2 | 88 | 60 | 5 | 3 | 80 | 48 |
| 360 | 240 | no | 45 | 30 | 2 | 2 | 90 | 60 | 5 | 3 | 80 | 48 |

According to an example based on the first row of the above table, the original size of the key frame picture may be 720×576 pixel, wherein the picture does not relate to a wide screen format. In this case, 90×72 DCT blocks having a size of 8×8 pixels are provided. This directly corresponds to the usual non-wide screen aspect ratio. Thus, a size correction is not required. Scaling is performed by deriving the number of macroblocks, i.e. 5×4 macroblocks (each having a size of 16×16 pixels) in the present example. In view of the fact that the scaling is based on a grid of 16×16 pixels, the above numbers of macroblocks correspond to a factor eight scaling in the horizontal and vertical direction, respectively. However, it is noted that the number of DCT blocks according to the converted macroblocks size does not necessarily correspond to the number of DCT blocks according to the original size. Thus, a cropped size may be generated by the scaling operation, since the scaled key frame size must fit into the corresponding slice grid of the background picture. In the present example, the DCT size of 90×72 is cropped to a size of 80×64 in order to obtain an integer number of macroblocks, i.e. 5×4 macroblocks.

To achieve desired aspect ratios and picture sizes, DC coefficient pictures are generated by obtaining a DC coefficient for each of the above DCT blocks and are zoomed according to the values listed in the aspect ratio column. The cropping operation may be performed by a cutting operation. Alternatively, a border can be added round the frame to obtain the indicated size plus one macroblock in each direction.

The first eight rows of the above table are applicable for frame pictures with progressive content, whereas the last eight rows of the above table can be used for both field and frame pictures. Frame pictures (i.e. SIF (Source Input Format) pictures) having interlaced content are more complicated, since one field must be selected for each macroblock, thereby reducing the vertical resolution to that of one field. Consequently, the last eight rows of the above tables should be used due to their vertically increased aspect ratio.

FIG. 2 shows a basic block diagram of the scaling unit 16, wherein the description is performed on the basis of the above example according to the first row of the above table.

According to FIG. 2, the scaling unit 16 is composed of a decoding section 160 arranged for performing an inverse run-length decoding to detect macroblocks, blocks, and coefficients of the blocks, and for supplying the decoded key frame picture to a macroblock search section 161 arranged for identifying individual macroblocks, based e.g. on a pixel counting and extracting operation. The macro-blocks are necessary to generate the scaled key frame. Invisible macroblocks due to cropping are excluded. The identified individual macroblocks are supplied to a DC extracting section 162 arranged for obtaining the relevant DC coefficients of each macroblock. The inverse run-length decoding is necessary to be able to identify the individual macroblocks and to find the relevant DC coefficients. Thus, according to the preferred embodiment, the key frame scaling process is performed in the compressed domain with the constraint of an 8×8 scaling, with a fixed scaling factor of eight in both horizontal and vertical direction.

In the case of the above example, a compressed key frame picture of an original size of 720×576 pixels is input to the decoding section 160. There, the inverse run-length decoding is performed to obtain DCT blocks according to the Discrete Cosine Transform (DCT) which is a process for converting spatial amplitude data of the image into spatial frequency data and which is performed on 8×8 blocks (DCT blocks). Based on the result, individual macroblocks can be identified in the macroblock search section 161. The identification can be performed by a look-up table operation, by a bit or byte counting operation or by a DCT block counting operation and a subsequent division and rounding operation, so as to obtain the number of macroblocks. Then, the DC extracting section 162 selects or extracts each of the relevant DC components from the identified individual macroblocks and de-quantises them to obtain a non-compressed scaled key frame picture of a size 90×72 DC components. Each de-quantised DC coefficient forms a pixel of the resulting scaled key frame. This scaled non-compressed key frame picture is then supplied to the MPEG encoder 13 so as to be encoded and inserted into the encoded background picture obtained from the RAM 15 in the assembling unit 12. The operation may be optimised by arranging the MPEG encoder 13 so as to start encoding as soon as 16 pixels of the scaled key frame picture have been derived in the scaling unit 16.

As an alternative scaling operation, the scaling of the key frame pictures could be performed in the pixel domain, if the described DC component selection scaling does not provide enough flexibility. In this case, the original compressed or encoded key frame picture is first decoded and then scaled to a desired size with an appropriate filtering operation. Thus, the macroblock search and DC extracting operation is not required.

The efficiency of the usage of the memory resources and processor performance can be improved by employing only a limited number of code words per block. Thereby, only a limited number of coefficients need to be de-quantized and the IDCT operation can be optimised by reducing the number of required multiplications. Additionally, the memory bandwidth can be optimised by combining or merging the scaling operation with the macroblock decoding operation. Thus, also in the above alternative scaling case, the background picture can be assembled with the key frame picture in the compressed domain.

Figure 3:
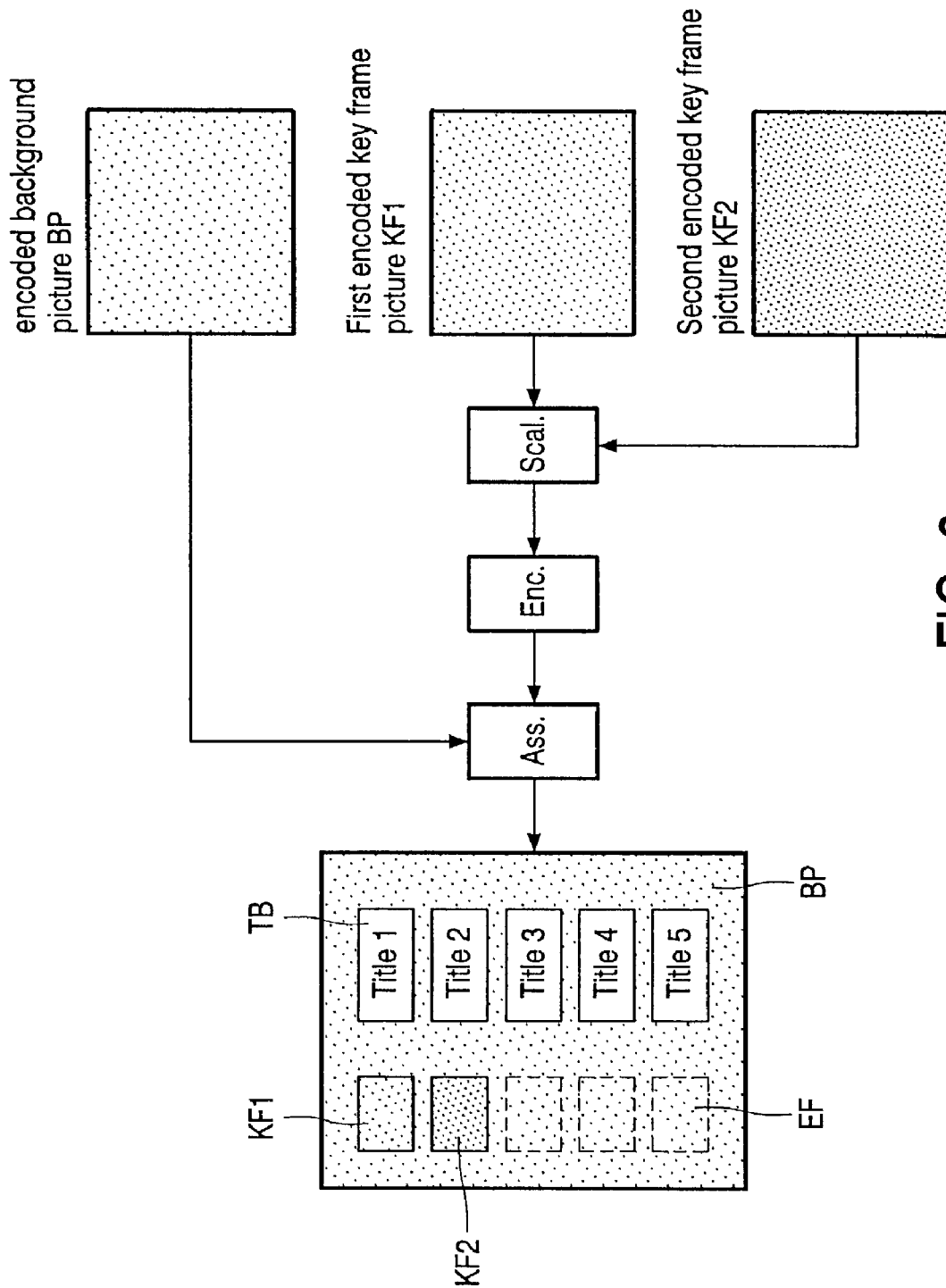
FIG. 3 shows a diagram indicating an assembly operation of a menu picture indicating a table of content.

In general, all scaled or resized frame pictures can be inserted in the background picture at any position on the 16×16 grid. FIG. 3 shows a diagram indicating the assembly of a table of content (TOC) picture. According to FIG. 3, an encoded background picture BP and two encoded key frame pictures KF1 and KF2 are assembled in such a way that the key frame pictures KF1 and KF2 are inserted at two predetermined portions on the upper left side of the background picture BP. Moreover, a number of title buttons TB may be inserted by the assembling unit 12, which can be selected and pressed by a corresponding input device of the I/O unit 17. As can be gathered from FIG. 3, predetermined empty fields EF are provided on the TOC picture to insert other key frame pictures relating to the titles 3 to 5 of the corresponding optical disc.

The encoded key frame pictures KF1 and KF2 are read from the RAM 15 and supplied to the scaling unit 16 which performs a corresponding scaling operation as described above. When the scaling sector is selected according to the number of macroblocks contained in the corresponding target field into which the key frame pictures are to be inserted. The scaled key frame pictures which have been decoded during the scaling operation are encoded and supplied to the assembling unit 12 so as to be inserted at the corresponding position of the background picture BP.

If the limitation of scaling to the factor eight is not acceptable, it is necessary to decode each macroblock before deriving its contribution to the scaled picture. The IDCT and inverse quantization should however be limited to a limited number of coefficients determined by the scaling factor, as described above.

Figure 4:
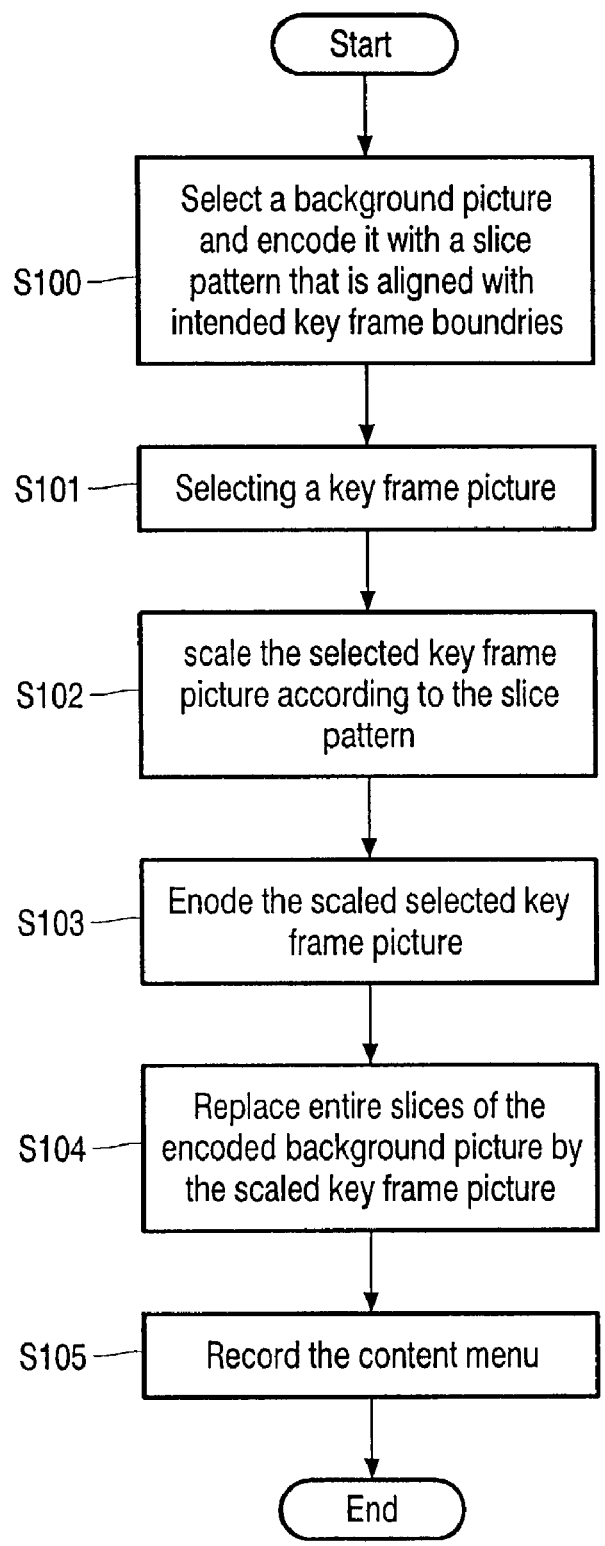
FIG. 4 shows a basic flow diagram of a menu generating operation according to the preferred embodiment.

FIG. 4 shows a diagram of the menu picture generating operation according to the preferred embodiment. In step S100, a background picture is selected and encoded with a with a slice pattern that is aligned with the intended key frame boundaries. Then, a key frame picture is selected in step S101 for a desired menu picture. The selection may be performed according to a default setting or based on an input operation at the I/O unit 17. Then, a slice-oriented scaling of the selected key frame picture is performed by the scaling unit 16 in step S102. In particular, the scaling is performed e.g. by the factor eight to match the size of the selected key frame picture with the size of the corresponding insertion field of the background picture according to the 16×16 pixel grid. Then, the scaled selected key frame picture is encoded in the MPEG encoder 13 (step S103), and entire slices of the insertion field of the encoded background picture are replaced by the corresponding slice or slices of the scaled key frame picture (step S104). Thereafter, the assembled or generated menu picture is recorded at a predetermined location on the recordable optical disc 20 (step S105).

Thus, the entire operation is performed in the compressed picture domain, i.e. no pictures need to be decoded and only a small part of the menu picture, corresponding to the scaled key frame, is encoded. Thereby, a use of the normal encoding-decoding pipeline is not required, and the achieved minimal complexity of the operation leads to a minimum of additional hardware and software. The functional processing blocks depicted in FIGS. 1 and 2 may be implemented as hardware (or signal processing) units or as program routines for controlling the system processor.

However, it is to be noted that the constraints that the key frame must be placed on a grid of 16×16 pixels and that the key frame scaling is optimised by only supporting a scaling by a factor eight is not an essential requirement of the present invention. Any kind of grid and scaling factor can be implemented if increased processing requirements are acceptable. Moreover, the present invention can be applied to any recording operation for recording on any kind of record carrier on which a menu picture generated by combining a background picture and a key frame picture is recorded in an encoded or compressed form. The key frame picture is scaled according to a predetermined slice grid of the background picture and the assembly operation is performed in the compressed or encoded domain.

The invention claimed is:

1. A method for generating a menu picture composed of a background picture and a subpicture overlay, said method comprising the steps of:
    a) scaling at least one key frame picture to a predetermined size, wherein the step of scaling further comprises extracting at least one DC coefficient and wherein each at least one DC coefficient is used to form a pixel in the at least one key frame picture;
    b) assembling said background picture and said scaled at least one key frame picture to form said menu picture; and
    c) recording said menu picture to a predetermined area on a record carrier (20), characterized by the step of:
    d) compressing said scaled at least one key frame picture before said assembling step; and
    e) performing said assembling step in the compressed picture domain.

2. A meted according to claim 1, characterized in that said assembling step is performed by replacing entire portions of said background picture by new portions which represent said scaled at least one key frame picture.

3. A method according to claim 2, characterized in that said entire portions are slices.

4. A method according to claim 2, characterized in that each of said portions has a predetermined size and said scaled at least one key from picture constitutes an integer number of said portions.

5. A method according to claim 2, characterized in that said key frame picture is placed on a grid of a predetermined pixel number.

6. A method according to claim 2, characterized in that said scaled at least one key frame picture is stored as a separate entity comprising a set of said portions.

7. A method according to claim 2, characterized in that said background in picture comprises a grid of said portions, wherein boundaries of said portions are located at insertion portions of said at least one key frame picture.

8. A method according to claim 1, wherein said scaling is a factor eight scaling.

9. A method according to claim 8, characterized in that a scaled non-compressed key frame picture is extracted from a compressed key frame picture by performing a variable length decoding, extracting the DC coefficient for every block, and de-quantizing the extracted DC coefficients.

10. A method according to claim 1, characterized in that said scaling step is performed by decoding macroblocks and deriving their contribution to the scaled at least one key frame picture.

11. A method according to claim 2, characterized in that a margin is added around said scaled key frame picture so as to match the size of said scaled key frame with the size of at least one of said entire portions.

12. A method according to claim 10, characterized in that a limited number of codewords is employed per macroblock.

13. A recording device for recording a menu picture on a record carrier (20), said recording device comprising:
    a) scaling means (16) for scaling at least one key frame picture to a predetermined size, said scaling means including extracting means (162) for extracting DC coefficients of predetermined macroblocks of the key frame picture and wherein each at least one DC coefficient is used to form a pixel in the at least one key frame picture;
    b) assembling means (12) for assembling said background picture and said scaled at least one key frame picture to form said menu picture; and
    c) recording means (11) for recording said menu picture to a predetermined area on said record carrier (20), characterized by:
    d) compressing means (13) for compressing said scaled at least one key frame picture and supplying said compressed scaled at least one key frame picture to said assembling means (12);
    e) wherein said assembling means (12) is arranged to assemble said background picture and said key frame picture in the compressed picture domain.

14. A recording device according to claim 13, characterized in that said assembling means (12) is arranged to perform a slice replacement operation to assemble said background picture and said at least one key frame picture.

15. A recording device according to claim 13, characterized in that said scaling means (16) comprises variable run-length decoding means (160) for performing a variable length decoding of said key frame picture.

16. A recording device according to claim 15, characterized by searching means (161) for searching said predetermined macroblocks.

17. A recording device according to claim 13, characterized in that said scaling means (16) comprises decoding means for decoding predetermined macroblocks, and is arranged to derive a contribution of the decoded macroblocks to said scaled at least one key frame picture.

18. A record carrier on which a menu picture generated by a method according to claim 1 is recorded.

19. A record carrier according to claim 18, characterized in that said record carrier is DVD playback compatible.

20. A record carrier according to claim 18, wherein the assembling means replace entire portions of said background picture by new portions which represent said scaled at least one key frame picture.

* * * * *